No. 835,451. PATENTED NOV. 6, 1906.
E. D. MEADERS & J. T. BROWN.
COTTON SCRAPER.
APPLICATION FILED SEPT. 26, 1905.

Witnesses
Wm. Koerth
C. C. Hines

Inventors
E. D. Meaders,
J. T. Brown,
By Victor J. Evans
Attorney

THE NORRIS PETERS CO., WASHINGTON, D. C.

UNITED STATES PATENT OFFICE.

EDDIE D. MEADERS AND JESSIE T. BROWN, OF ALBERTVILLE, ALABAMA.

COTTON-SCRAPER.

No. 835,451.          Specification of Letters Patent.          Patented Nov. 6, 1906.

Application filed September 26, 1905. Serial No. 280,234.

*To all whom it may concern:*

Be it known that we, EDDIE D. MEADERS and JESSIE T. BROWN, citizens of the United States, residing at Albertville, in the county of Marshall and State of Alabama, have invented new and useful Improvements in Cotton-Scrapers, of which the following is a specification.

This invention relates to improvements in cotton-cultivators.

The object of the invention is to provide an improved construction and arrangement of cultivator-blades to run astride of a row of cotton before it is put to a stand and to remove the weeds and throw the earth away from the cotton into the spaces between the adjoining rows, thus working the adjacent sides of the row or siding the plants. The blades may be applied to any ordinary cultivator or harrow adapted to work astride the row and may be used for siding other plants.

The preferred embodiment of the invention is illustrated in the accompanying drawings, in which—

Figure 1:
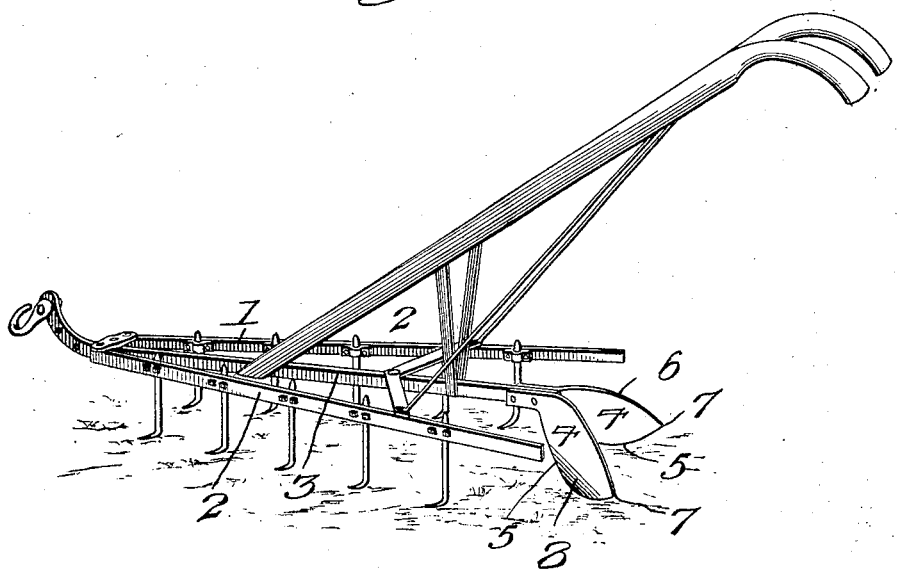
Figure 2:
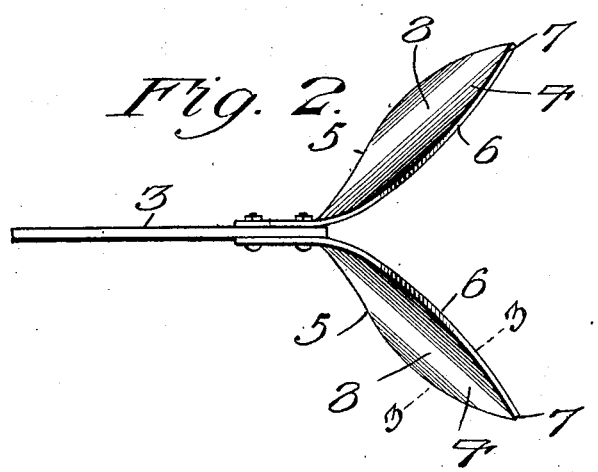
Figure 3:
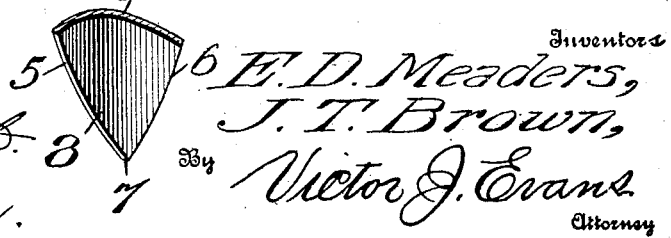

Figure 1 is a perspective view of a so-called "top" harrow having the improved cultivator-blades applied thereto. Fig. 2 is a plan view, on an enlarged scale, of a portion of the main or central beam thereof and the cultivator-blade. Fig. 3 is a transverse section through one of the blades on the line 3 3 of Fig. 2.

The frame 1 of the implement may be of any preferred construction. In the present instance we have shown an ordinary top harrow, of which 2 designates the divergent side beams thereof carrying the harrow-teeth and 3 the main or central beam. Bolted or otherwise attached to and arranged on opposite sides of the beam 3 at the rear end thereof are diverging hoes or cultivator-blades 4. Each blade has a concavo-convex body provided with a downwardly, rearwardly, and outwardly curved cutting edge 5 and an upper rear curved edge 6, the edges converging at the rear end of the blade to a point 7. The blade thus has a general form of a substantially pear-shaped disk. The concavity of the blade is such that the rear portion of each blade has a pronounced outward swell, as shown at 8, forming, in effect, a wing or sweep to throw the soil outward. Each blade is provided with an attaching-arm 4', projecting forwardly from its upper front edge and bolted or otherwise fastened to the beam 3.

The implement is drawn or pushed astride of and along the row, the edges 5 acting to loosen up the soil at the adjacent sides of the hill and cut out the weeds, while the wings 8 throw the earth from the cotton to the spaces between the adjoining rows. The implement will thus simultaneously act upon both sides of a hill or row, thereby insuring economy in time and labor.

Having thus described the invention, what we claim is—

A straddle-row cultivator comprising a central beam and diverging side beams, said side beams being provided with depending cultivating devices, and cultivator-blades secured to the rear end of the central beam and extending at a downward and rearward angle therefrom, each blade being substantially in the form of a pear-shaped disk of concavo-convex form and having a forward cutting edge and a lower rear portion formed with a pronounced outward swell producing an outwardly-curved wing, the blades having their convex faces in juxtaposition and arranged in divergent relation to each other.

In testimony whereof we affix our signatures in presence of two witnesses.

EDDIE D. MEADERS.
            JESSIE T. BROWN.

Witnesses:
  BENJAMIN B. FONTAINE,
  ERASTUES L. HOOPER.